UNITED STATES PATENT OFFICE.

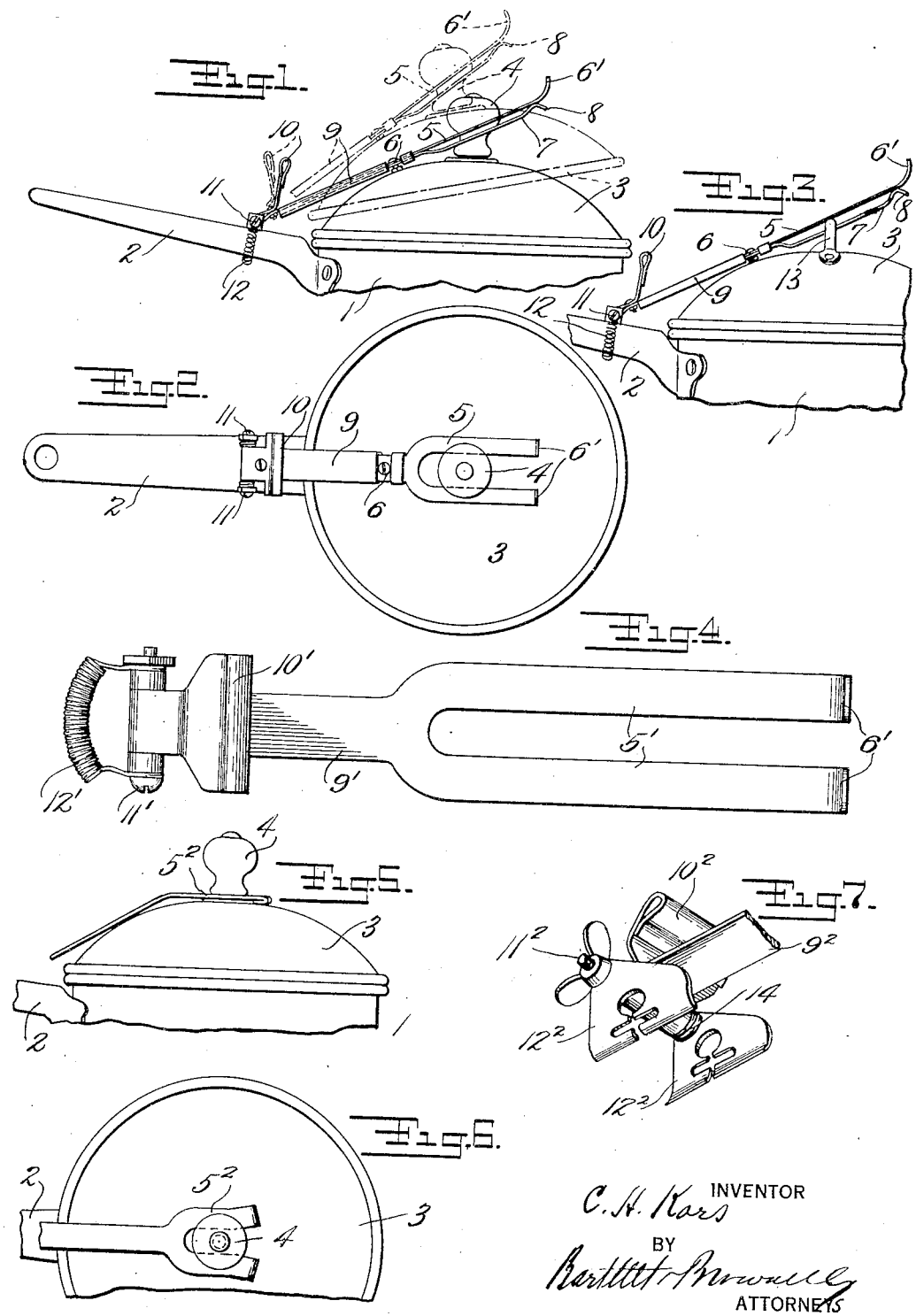

CHARLES H. KORS, OF PHILADELPHIA, PENNSYLVANIA.

UTENSIL-COVER HOLDER.

1,350,817.  Specification of Letters Patent.  Patented Aug. 24, 1920.

Application filed August 14, 1919. Serial No. 317,426.

*To all whom it may concern:*

Be it known that I, CHARLES H. KORS, a citizen of the United States, residing at Philadelphia, county of Philadelphia, State of Pennsylvania, have invented a certain new and useful Improvement in Utensil-Cover Holders, of which the following is a full, clear, and exact description.

My invention relates to utensil cover holders and has for its object to provide pivoted means supported by the handle whereby by the thumb of the handle holding hand the cover of a handle bearing utensil can be raised and held in raised position and also be held in closed position as the utensil is inverted. It further has for its object to make such means detachable so that it can be readily secured to the handle of the utensil and the cover thereof. It further has for its object to provide means whereby the device can be adjusted for larger or smaller covers and can be used in connection with a cover having a loop handle, as well as a cover having a knob handle.

The following is a description of an embodiment of my invention,

Figure 1 being a side elevation of a utensil to which the invention has been applied;

Fig. 2 is a plan view of the same;

Fig. 3 shows a side elevation of the device used in connection with a cover having a loop handle;

Fig. 4 is a plan view of a simplified form of the invention;

Fig. 5 is a side elevation showing another method of attaching the device to the cover;

Fig. 6 is a plan view of the same; and

Fig. 7 is a modified form of means for securing the device to the handle of the utensil.

Referring more particularly to the drawings, 1 is the top portion of a utensil having a handle 2 of ordinary form. 3 is a cover for the utensil having a knob handle 4. To the utensil handle 2 and the cover 3 by the knob 4 is secured a lifting device, the same comprising a lever having two arms at approximately right angles to one another. The two arms when the cover is in closed position are on the same side of a vertical plane passing through the handle of the utensil at a point adjacent to its inner end and to the fulcrum of the lever. The longer arm has a forked portion 5 having upturned tines 6' having substantially parallel opposing edges and a forked portion 7 having downturned ends 8 held in yielding engagement with the tines of the member 5, the members 5 and 7 being secured together at their shanks 6. These shanks enter a socket 9 forming part of the longer arm telescoping therein so that the structure consisting of the socket 9 and the forked members 5 and 7 can be extended or reduced in length as desired. Integral with the socket 9 is a thumb piece 10 constituting the short upwardly projecting arm of the lever, the connection between the two arms forming a loop through which passes a rivet or bolt 11, which constitutes a pivot or fulcrum for the lever. To the outer ends of this bolt 11 are secured the ends of a helical spring 12 with the bolt adapted to pass around the handle 2 and closely embrace the same so as to hold the bolt 11 thereto at a point adjacent to the inner end of said handle.

The device is applied to the utensil by slipping the spring 12 over the end of the handle 2 which holds the bolt 11 in place. The knob 4 of the cover is then slipped between the forked members 5 and 7 and the telescoping connection adjusted to the proper length, whereupon the device is ready for use in performing its intended functions. While holding the handle 2 with the main part of the hand, the thumb can be applied to the thumb piece 10 to either draw the thumb piece backward so as to lift the cover or to press it forward so as to hold the cover firmly in place upon the utensil. The forks 5 and 7 are somewhat elongated, which also enables the device to be used with covers of different diameter without changing the telescopic adjustment, and, furthermore, enables the cover to be lifted by the knob 4 and moved slightly so as to uncover the mouth of the utensil somewhat to permit the escape of steam when desired. If the utensil is hung up by the end of the handle 2 and the cover 3 becomes displaced from the body of the utensil and falls downward so that the knob 4 engages the upturned extensions 6', these extensions 6' will prevent the cover from falling to the ground.

Where the device is used with a cover having a loop handle, such as the handle 13 in Fig. 3, this handle is slipped between the yielding ends of the two forked members 5 and 7 as in Fig. 3, so that the device of Fig. 1 is adapted to be used with covers having either style of handle.

The device of Fig. 4 is a simplified construction in that it has but one forked member, being thereby adapted to be used with the knob type of handle only, and has no telescopic section, the tines of the forks being made long so as to enable the device to be used with covers of different diameter without the telescopic connection.

Referring more particularly to Fig. 4, 5' is an elongated forked member having an extension 9' terminating in a thumb piece 10' integral therewith, the connecting portion being bent so as to form a socket for the bolt 11' to the two ends of which the securing spring 12' is connected as shown, the forked member terminating in upturned ends 6' for the purpose hereinabove described. This embodiment is much simpler to manufacture and useful where a holder for one style of cover only is desired. It makes a cheaper and less complicated device.

Instead of having elongated forked members such as 5 and 5', adapted to engage the body of a knob upon a cover, the engaging portion may be short, as shown at $5^2$ in Figs. 5 and 6 and forced between the bottom of the knob and the body of the cover, as shown in said figures. This holds the cover slightly more rigidly and with the telescoping arrangement of Fig. 1 is applicable to covers of different diameter. Instead of using the holding spring 12, the supporting bolt may be provided with clamps for securing it to the handle 2, and this is desirable where utensils of larger size are used and a more rigid connection is desired. As shown in Fig. 7, $11^2$ is the bolt provided with clamping members $12^2$ which are adapted to engage the sides of the handle of a utensil, $9^2$ being the shank of the forked portion and $10^2$ the thumb piece connected thereto. Between the bend forming this connection and the clamping members $12^2$ are coiled springs 14, which act as yielding spacers centering the shank $9^2$ between the clamping members.

As will be evident to those skilled in the art, my invention permits of various modifications without departing from the spirit thereof or the scope of the appended claims.

What I claim is:

1. In a device for operatively securing a utensil cover to the handle of the utensil, the combination of a lever having a long arm and an upwardly projecting short arm at approximately a right angle to one another, means at the fulcrum of said lever for securing it to the utensil handle at a point adjacent to the inner end of said handle, and means for connecting the free end of the long arm to the cover, said arms when the cover is in closed position being on the same side of a vertical plane passing through said handle at a point adjacent to its inner end and to said fulcrum.

2. In a device for operatively securing a utensil cover to the handle of the utensil, the combination of a lever having a long arm and an upwardly projecting short arm at approximately a right angle to one another, means at the fulcrum of said lever for securing it to the utensil handle at a point adjacent to the inner end of said handle, said long arm being provided with a forked end having substantially parallel opposing edges adapted to engage the handle of said cover, said arms when the cover is in closed position being on the same side of a vertical plane passing through said handle at a point adjacent to its inner end and to said fulcrum.

3. In a device for operatively securing a utensil cover to the handle of the utensil, the combination of a lever having a long arm and an upwardly projecting short arm at approximately a right angle to one another, means at the fulcrum of said lever for securing it to the utensil handle at a point adjacent to the inner end of said handle, and means for connecting the free end of the long arm to the cover, said securing means consisting of a pivot pin and spring secured to the two ends thereof, and adapted to embrace and with said pin completely surround the handle of said utensil.

CHARLES H. KORS.